United States Patent Office 3,606,213
Patented Sept. 20, 1971

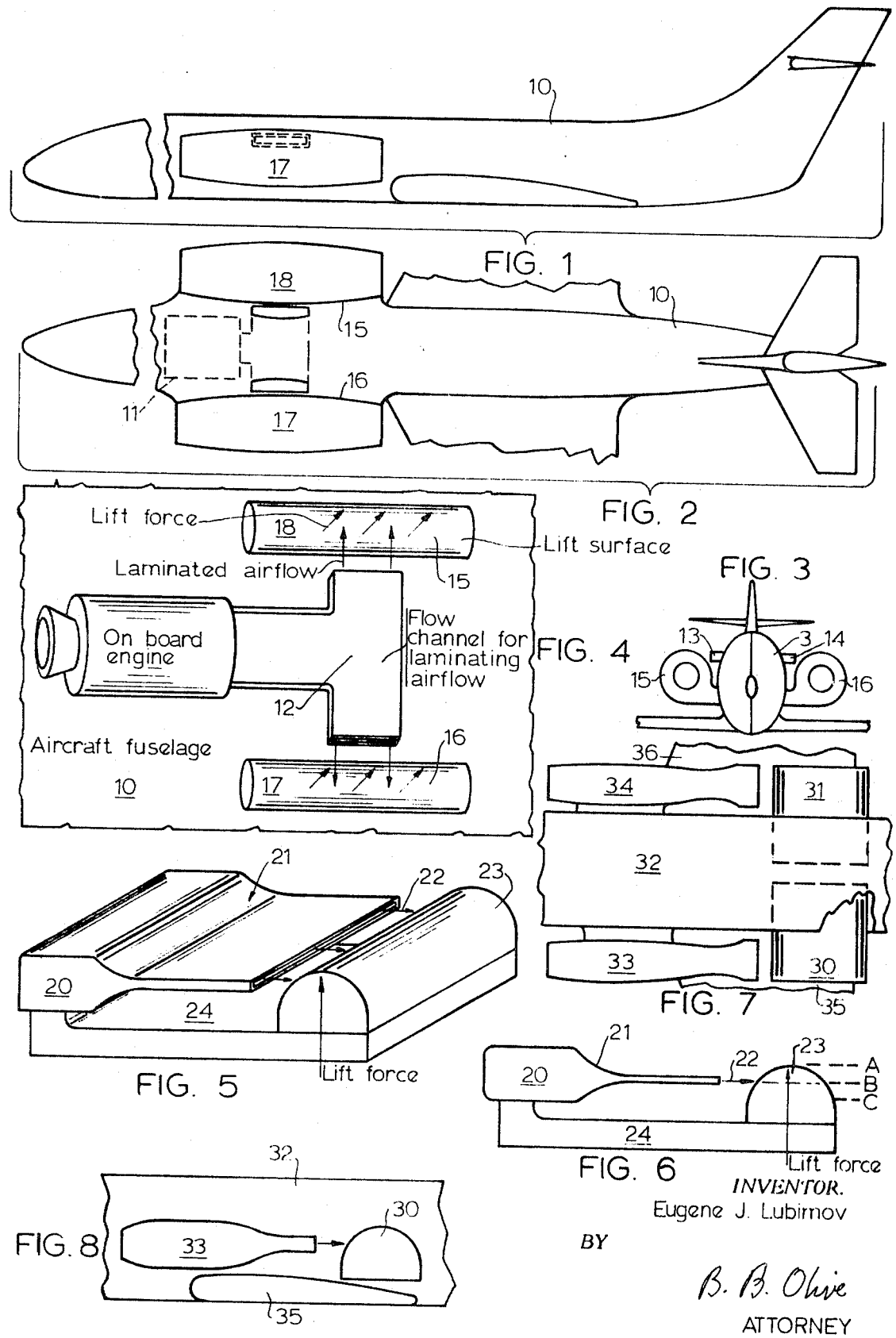

3,606,213
LAMINAR FLOW STRUCTURE
Eugene J. Lubimov, 668 Sirine Ave.,
Virginia Beach, Va. 23462
Filed May 5, 1969, Ser. No. 821,855
Int. Cl. B64c 3/00
U.S. Cl. 244—35          3 Claims

ABSTRACT OF THE DISCLOSURE

An air foil lift effect is created by directing air from an onboard pressurizing source such as a turbine, through a channel which tends to laminate the flow and to direct the laminated flow against a curved surface where the lift effect is produced.

BACKGROUND OF THE INVENTION

(1) Field of the invention

The invention relates to devices for creating lift effects in fluids and particularly to aircraft foils and means for utilizing aircraft foils to create lift.

(2) Description of the prior art

Aircraft foils, hydrofoils and the like have universally obtained lift by moving the foil through the mass of unformed fluid, i.e. through air. Virtually no attempt has been made to form the air into any shape, e.g. laminate or layer before it strikes the foil. An aircraft wing, for example, is forced through the air and the air strikes the leading edge of the wing as an undistributed mass. There have been some propeller aircraft engines with large annular rings mounted in front of the engines and whose purpose has been to direct the air to the propeller foils as a column of air.

SUMMARY OF THE INVENTION

The invention depends on the discovery that if a fluid, i.e. gas e.g. air or liquid, is pressurized and is laminated, that is, formed into a substantially thin, flat layer and is then discharged against and deflected by certain kinds of curved surfaces and under the condition that the plane of the layer is directed to strike the surface at some predetermined angle that a lift effect can be obtained. In the embodiments disclosed, pressurized exhaust gas air from an onboard pressurizing engine, e.g. a gas turbine, is directed through channels which tend to laminate the gas and the gas in the laminar form is directed either rearwardly, laterally or forwardly against deflecting curved surfaces which produce the desired lift. The particular curved surface that produces the desired lift of the invention has been found to be substantially unlike the typical tear-drop air foil shape and rather in a preferred form is a more or less circular or semi-circular shape.

DESCRIPTION OF THE DRAWINGS

FIG. 1 is a side elevation and somewhat schematic view of an aircraft employing the invention.
FIG. 2 is a plan view of the aircraft of FIG. 1.
FIG. 3 is a front elevation of the aircraft.
FIG. 4 is a schematic fragmentary enlarged plan view of portions of the aircraft.
FIG. 5 is a generalized view of the components of the basic invention.
FIG. 6 is a generalized side elevation of the FIG. 5 components.
FIG. 7 is a fragmentary plan view of a second embodiment of the invention.
FIG. 8 is a fragmentary side elevation view of the embodiment of FIG. 7.

DESCRIPTION OF THE INVENTION

At least since Leonardi da Vinci it has been proposed to produce aerodynamic lift by moving a generally teardropped shaped foil, a slightly curved flat foil or the like through a mass of air and to obtain the lift by creating a partial vacuum above the foil and thus a pressure differential between the foil's upper and lower surfaces. All helicopter blades, aircraft wings and the like work on this principle. No attempt has heretofore been made to pressurize and then laminate or layer the air before it strikes the leading edge of the curved surface, i.e. the foil and lift has universally been obtained by moving the lifting foil through a mass of air.

The present invention resides in the simple but astounding discovery that certain curved surfaces when impinged upon in certain areas with substantially thin, flat layers of a fluid medium, i.e. gas or air, as distinct from an uncollected mass of air will produce extraordinary and completely unexpected lift forces and of the type required to lift heavier than air aircraft and the like. However, irrespective of its immediate application to aircraft structures which will inherently entail substantial design and development work for specific structures, the invention provides a useful research tool and also provides an air lift concept that can be readily applied to small scale models, toys and the like. The concept has been proven at this level.

FIGS. 1–4 represent an aircraft structure 10 having an onboard engine 11, e.g. a gas turbine which acts to receive and pressurize air and to produce a pressurized exhaust gas or air which is directed through a T-shaped conduit 12 whose purpose is to direct the exhaust gas so that it is laminated or formed into a relatively or substantially thin, flat layer and turned laterally just prior to being ejected into the atmosphere out of rectangular openings 13, 14 in the form of a layer of air or gaseous fluid. Openings 13, 14 are located immediately adjacent to a respective pair of semi-circular housings 15, 16 which may, for example, be the housings of two outboard turbine or jet engines 17, 18. In operation the exhaust gas is formed as a pressurized layer of air and is impinged upon the selected surfaces 15, 16 immediately after leaving the exhaust openings 13, 14. Experimentation with any particular surface will indicate exactly what conditions, i.e. precise form and size of layer, precise air velocity, precise distance of exhaust opening from surface, precise shape of surface etc., that must be met to maximize the amount of lift.

FIGS. 5 and 6 illustrate the invention still further in general turns. Basic to the invention is the need for a source of pressurized fluid 20, channelling means 21 for converting the fluid, i.e. air or gas to a substantially thin, flat laminar or layer form 22, a lifting surface 23 whose curvature and location with respect to the layer is such that when impinged upon by the layer, produces a lift effect on a base member 24 which is rigidly fixed to and moves with source 20 and surface 23. The semi-circular form shown in the drawings has been found to produce promising results when used with a very narrow exhaust opening. Some lift begins to be exhibited at position A and down to position C with maximum lift in the relative position B. Other cylindrical or semi-cylindrical shapes as well as other curved surfaces will be found to produce the same lift effect when struck by a thin layer of laminated air. Also, it is contemplated that the "pressurized means" may be either in the form of a turbine or jet engine as illustrated or in the form of a rocket engine. In some applications the "fluid medium" might be water.

In another embodiment of the invention, see FIGS. 7 and 8, lifting surfaces 30, 31 project laterally with respect to the longitudinal axis of the aircraft fuselage 32. Respective pressurized, laminated gas layers are developed by laminating the exhaust gases from engines 33, 34 which are located in the embodiment of FIGS. 7 and 8 above wings 35, 36 and in front of the lateral lift surfaces 30, 31. As in the previously described embodiment the movement of laminated pressurized gas in a layer against the upper portion of each respective semi-circular lift surface 30, 31 creates a lift effect. As indicated by the dashed line position, lift surfaces 30, 31 are movable laterally so as to be able to reside within or substantially within fuselage 32 and thus destroy the lift effect or each may be extended laterally from within fuselage 32 by hydraulic means or the like, not shown, as shown in solid lines and to gain the maximum lift effect.

What is claimed is:
1. A structure capable of lifting itself vertically in a fluid medium through which the structure moves, comprising:
   (a) pressurizing means adapted to continuously discharge a fluid at an exhaust under some substantially high pressure and velocity relative to the pressure and velocity of said fluid medium;
   (b) conduit means connected to said exhaust and adapted to form the exhausted fluid into a substantially thin layer for passing through an outlet at some predetermined outlet velocity and pressure;
   (c) a surface having a selected curvature and being selectively positioned near said outlet and such that said layer of fluid exhausted through said outlet is directed toward a selected line of contact with said surface, the selection of said pressures, velocities, curvature, positioning and line of contact being coordinated such that a lift force in a direction substantially perpendicular to the direction of flow of fluid exhausted through said outlet is produced on said surface, said surface being provided by an engine mounted on said structure; and
   (d) a base member comprising a flight structure integrally supporting said pressurizing means, conduit means and surface to maintain the relative positioning thereof during movement through said fluid medium.

2. A flight structure including a fuselage capable of lifting itself vertically and moving forwardly in a fluid medium, comprising:
   (a) a pair of jet engines, one mounted on each side of said fuselage, adapted to continuously discharge a fluid through exhausts under some substantially high pressure and velocity relative to the pressure and velocity of said fluid medium;
   (b) conduit means connected to said exhausts and adapted to form the exhausted fluid into a horizontal and substantially thin layer for passing through outlets at some predetermined outlet velocity and pressure;
   (c) a pair of surfaces provided by projections extending from each side of said fuselage and having substantially semi-circular cross-sections selectively spaced from near said outlets and such that said layer of fluid exhausted through said outlets is directed toward a selected line of contacts with said surfaces with the selection of said pressures, velocities, curvature, positioning and line of contact being coordinated such that a lift force in a direction substantially perpendicular to the direction of flow of fluid exhausted through said outlet is produced on said surface; and
   (d) support means forming part of said flight structure integrally supporting said engines, conduit means and surfaces to maintain the relative positioning thereof during movement through said fluid medium.

3. A structure as claimed in claim 2 wherein said projections are moveable from positions within said flight structure to positions near said outlets.

References Cited
UNITED STATES PATENTS 3,012,740  12/1961  Wagner _____ 244—42
3,260,477  7/1966   Grahame _____ 244—42X MILTON BUCHLER, Primary Examiner F. K. YEE, Assistant Examiner U.S. Cl. X.R.
244—41, 45